United States Patent Office 2,809,176
Patented Oct. 8, 1957

2,809,176

REACTION PRODUCTS OF DEXTRAN-MODIFIED POLYESTER WITH UREA-FORMALDEHYDE ALCOHOL CONDENSATES AND METHOD OF PRODUCING

Elwood P. Wenzelberger, Dayton, Ohio, assignor to The Commonwealth Engineering Company of Ohio, Dayton, Ohio, a corporation of Ohio No Drawing. Application November 30, 1954,
Serial No. 472,233

17 Claims. (Cl. 260—17.3)

Compositions containing urea-formaldehyde condensates and modified urea-formaldehyde condensates available heretofore have been thermosetting or drying preparations of limited utility. Mixtures of urea-formaldehyde with resins made from a polyhydric alcohol and a polycarboxylic acid prepared previously have required heating or oxidizing for hardening and insolubilization in a practicable time period, which precludes use thereof on paper, leather and other organic materials that are damaged by heat or subject to oxidation and deterioration.

It has been found that unsaturated, dextran-modified polyester or alkyd type resins differ from the general run of definitely thermosetting polyester resins in being on the borderline between thermosetting and thermoplastic so that they may be set by heat-curing or by cooling in feasible time periods. It is found that the dextran functions as a co-reacted control which functions to diminish, to the extent of the amount thereof present, the thermosetting characteristics of the polyesters. The extent to which the dextran modifies the thermosetting property of the polyester is influenced by the alcohol component of the ester, the dextran-modified polyesters derived from glycerol or other alcohol containing more than two hydroxyl groups being on the borderline but tending to be more definitely thermosetting than those derived from dihydric alcohols like ethylene glycol, which tend to be more definitely thermoplastic.

An object of this invention is to take advantage of the unique properties of the dextran-modified polyester resins for modifying the characteristics of urea-formaldehyde-alcohol condensates and to obtain products which can be applied to organic materials without use of organic solvents and without requiring baking at high temperatures.

This and other objects are accomplished by providing new plastic masses or compositions which are reaction products of the dextran-modified polyesters and urea-formaldehyde-alcohol condensates. These reactions products are obtained by mixing the resinous but fluid dextran-modified partially condensed polyester with a solution of a hydrocarbon solvent-soluble urea-formaldehyde-alcohol condensate in the alcohol reactant, and, with or without the addition of such adjuvants (pigments, dyes, fillers, effect materials such as metallic particles) as may be desirable, heating the blend, with continued mechanical working, to obtain a resinous composition which hardens on cooling or on heating to comparatively low temperatures.

The dextran-modified polyester is obtained by heating dextran, at least one unsaturated polycarboxylic acid, anhydride or functional derivative thereof, and a polyhydric alcohol together until a resinous but fluid and still reactive partially condensed polyester is obtained.

The polycarboxylic acids which may be used include maleic, fumaric, phthalic, chlormaleic, chlorfumaric, citraconic, methylethyl maleic, diethyl maleic, chloromethyl maleic and mesaconic acids. The polyhydric alcohols include ethylene glycol, di-, tri-, or tetramethylene glycol, propylene glycol, dipropylene glycol, trimethylene glycol, glycerol or penta-erythritol.

The dextran which is co-reacted with the polycarboxylic acid and polyhydric alcohol may be biosynthesized from sucrose by the action of specific microorganisms such as those of the *Leuconostoc mesenteroides* or *L. dextranicum* types of their enzymes. The procedure is to inoculate an aqueous sucrose-bearing nutrient medium of appropriate composition with a culture of the microorganism, or the enzyme filtered from the culture, and incubate the mass until the dextran is synthesized in maximum yield, when it is precipitated by adding a water-miscible alcohol or ketone to the fermentate. The precipitated product is "native" dextran normally having a high molecular weight calculated to be in the millions and of varying 1,6 to non-1,6 linkages ratios, depending on the microorganism used for the synthesis. This "native" dextran may be purified and reduced to particulate condition for interaction with the acid and alcohol. Alternatively, before or after isolation from the fermentate, or before or after purification and/or reduction to particulate condition, it may be hydrolyzed to dextran of lower molecular weight. In general, the dextran may have a molecular weight in the range from 5000 to that of native, microbiologically produced dextran (determined by light scattering measurements), and a 1,6 to non-1,6 linkages ratio of 1.9:1 to 30:1.

In preparing the polyester, the relative proportions of the respective components may be varied, and either the polycarboxylic acid or polyhydric alcohol may predominate, the dextran being usually used in relatively minor amount. In general, the dextran-modified unsaturated polyester is obtained by heating a mixture of, by weight, 30% to 75% of the polycarboxylic acid or anhydride, 15% to 60% of the polyhydric alcohol, and 5% to 25% of the dextran, the total of these ingredients equalling 100%. The three reactants may be mixed together directly, or the dextran or a portion thereof may be dissolved or dispersed in the polyhydric alcohol with heating, and the solution or dispersion added to the liquid acid or anhydride, the mass being then heated with agitation to reaction temperature and until a homogeneous, resinous, viscous but still fluid product is obtained. Temperatures of 50° C. to 300° C. may be used. These products may be mechanically worked and heated with the solution of the urea-formaldehyde-alcohol condensate.

The urea-formaldehyde-alcohol condensate reacted with the dextran-modified polyester may be obtained by reacting urea and formaldehyde in the presence of an alcohol and preferably a monohydric alcohol such as ethanol or butanol, or other alcohol of up to ten carbons. An acid catalyst may be used to expedite the reaction. Also, the initial condensation of the urea and formaldehyde may be effected in aqueous solution, the water removed, and the condensation continued with the alcohol replacing the water. The condensation reaction is continued until the product is insoluble in water but soluble in hydrocarbon solvents. They may be used as viscous solutions in an excess of the reactant alcohol.

In preparing the final reaction products of the invention, either the dextran-modified polyester or the urea-formaldehyde-alcohol condensate may predominate in the initial reaction mixture, i. e., either component may be used in an amount of 5% to 95% by weight. Equal amounts by weight may be used. However, one of the preferred products is obtained from a mixture of the dextran-modified polyester and from 5% to 30% of the urea-formaldehyde-alcohol condensate. The reactants are worked together in a suitable kneading device until a homogeneous, insoluble reaction product is obtained as a granular powder which can be sheeted or formed into films on rubber rolls.

Various adjuvants may be included for modifying the properties of the products to adapt them to different uses. The inclusion of other resins, such as natural resins, ester gums, oil-soluble phenol-formaldehyde condensates and maleic anhydride-rosin condensates help to overcome tackiness, impart hardness, gloss and fullness, supply plasticity and act as extenders. Plasticizers increase the softness, tackiness, stickiness, etc., and may be such materials as butyl phthalate, tricresyl phosphate, ethyl citrate, polyalcohol-adipic acid or sebacic acid condensates, sulfonamide resins, blown or oxidized castor oil, etc. Waxes assist in removing "tack," improving "slip," providing smoother surfaces, and increasing the workability of films, as for calender finishes, the useful waxes including candelilla, carnauba, paraffin, montan, etc. Metallic soaps, such as aluminum, calcium or zinc stearates or palmitates, and so on, provide slip, facilitate smooth calendering operations, increase water-resistance, etc. Pigments may be added. Also, starch, casein, gums and the like may be used to facilitate the preparation of stable aqueous dispersions of the reaction products. These modifying agents are used in minor amounts only, for varying the superficial properties of the reaction products and the total of the added adjuvants is not over 20 to 25% on the combined weight of the adjuvants and reaction product.

The dextran-modified polyester and the alcohol solution of the urea-formaldehyde-alcohol condensate are heated for 15 minutes to several hours, with working as for instance in a Werner-Pfleiderer mixer, until a homogeneous reaction product is obtained which may vary from a coarse, granular powder to a tough, rubbery sticky mass, depending on the specific reactants and proportions used. The products can be further worked on a rubber mill and formed into sheets or films, and may be mixed with such fillers as wood flour, cork, asbestos, etc., to serve as binders in molding compositions.

The reaction products may be mixed with agents which facilitate dispersion of the products in aqueous media. Dispersing and wetting agents which are useful include fatty acid soaps, particularly amine soaps such as triethanolamine oleate or triethanolamine ricinoleate, sulfated alcohols, sulfonated ethers, sulfonated amide derivatives and the like. Protective colloids may be added for stabilizing the dispersion. A particularly effective dispersing aid and stabilizer is carboxymethyl dextran.

The dispersions may be made in kneading or mixing machines or on roller mills. The reaction products may be conditioned for dispersion in the aqueous medium by treatment with a softening agent which is an organic solvent, such as, toluene, for example.

The dispersions are useful in coating or impregnating applications and may be applied by dipping, spraying, roller coating, etc., to form adherent films on the substrate by dehydration. The coatings may be calendered.

The following examples are illustrative of specific embodiments of the invention, it being understood that these examples are not limitative.

*Example I*

Ninety-five parts of a dextran-modified polyester [obtained by dissolving 14.3 parts of particulate B-512 dextran (average M. W. about 30,000) in 40.4 parts of hot glycerol, adding the hot solution to 45.3 parts of melted maleic anhydride, and boiling the mass for 10–15 minutes with continuous stirring] are kneaded with 5 parts of a 60% butanol solution of a hydrocarbon-soluble urea-formaldehyde-butanol condensate, at 140–145° C. for 15–30 minutes until an insoluble resinous reaction product is obtained in the form of a granular powder.

*Example II*

Fifty parts of a dextran-modified polyester [obtained by mixing 11.6 parts of particulate B-512 native dextran in 52 parts of hot ethylene glycol, adding the hot solution to 36.4 parts of melted phthalic anhydride, and boiling the mass for 15 minutes] are kneaded with 50 parts of a 60% butanol solution of a urea-formaldehyde-butanol reaction product, at 140–145° C. for 15 minutes. A tough, rubbery, somewhat tacky reaction product results, and may be sheeted on a rubber mill. An aqueous dispersion is obtained by sheeting out 50 parts of the reaction product on a rubber mill, slowly adding to it, on the rolls, a paste of 3 parts carboxymethyl dextran derived from *L. m.* B-512 native dextran and containing an average of 2.9 carboxymethyl groups per anhydroglucopyranosidic unit, 5 parts triethanolamine oleate, and 5 parts concentrated ammonium hydroxide in 90 parts of water. About 40 parts of water are added on the rolls and after milling for three-quarters of an hour, the product is put in a mixer and diluted with 190 parts of water containing 2.5 parts of concentrated ammonium hydroxide. The dispersion may be used as protective or decorative finish, pigmented or clear, for paper, textiles, leather, metal foil, etc. The dispersion described in Example I is coated on paper, the excess is removed by means of a doctor, and the paper is dried at 50° C. The paper has a smooth finish and is moisture-resistant. It is suitable for packaging various types of materials and for maintaining foods in moist, fresh condition.

The new reaction products have the advantages of the dextran-modified polyesters that baking and curing are not required after application thereof to a base, particularly when the polyester is present in preponderant amount, and at the same time have resilient or rubber-like properties imparted by the urea-formaldehyde-alcohol condensates. They can be used with advantage for applying flexible coatings to paper, leather and other materials that are heat sensitive. The aqueous dispersions containing wetting agents have the ability to wet both hydrophilic and hydrophobic surfaces.

What is claimed is:

1. A homogeneous plastic reaction product of (1) a fluid dextran-modified polyester obtained by interaction of components consisting essentially of a substance selected from the group consisting of unsaturated polycarboxylic acids and anhydrides thereof, a polyhydric alcohol and dextran, and (2) a solution of a hydrocarbon solvent-soluble urea-formaldehyde-alcohol condensate in the reactant alcohol.

2. A homogeneous plastic reaction product of (1) a fluid dextran-modified polyester obtained by interaction of ingredients consisting essentially of maleic anhydride, a polyhydric alcohol and dextran, and (2) a solution of a hydrocarbon solvent-soluble urea-formaldehyde-alcohol condensate in the reactant alcohol.

3. A homogeneous plastic reaction product of (1) a fluid dextran-modified polyester obtained by interaction of ingredients consisting essentially of phthalic anhydride, a polyhydric alcohol and dextran, and (2) a solution of a hydrocarbon solvent-soluble urea-formaldehyde-alcohol condensate in the reactant alcohol.

4. A homogeneous plastic reaction product of (1) a fluid dextran-modified polyester obtained by interaction of ingredients consisting essentially of maleic anhydride, glycerol and dextran, and (2) a solution of a hydrocarbon solvent-soluble urea-formaldehyde-alcohol condensate in the reactant alcohol.

5. A homogeneous plastic reaction product of (1) a fluid dextran-modified polyester obtained by interaction of ingredients consisting essentially of maleic anhydride, propylene glycol and dextran, and (2) a solution of a hydrocarbon solvent-soluble urea-formaldehyde-alcohol condensate in the reactant alcohol.

6. A homogeneous plastic reactant product of (1) a fluid dextran-modified polyester obtained by interaction of ingredients consisting essentially of phthalic anhydride, glycerol and dextran, and (2) a solution of a hydrocarbon solvent-soluble urea-formaldehyde-alcohol condensate in the reactant alcohol.

7. A homogeneous plastic reaction product of (1) a fluid dextran-modified polyester obtained by interaction of ingredients consisting essentially of phthalic anhydride, ethylene glycol and dextran, and (2) a solution of a hydrocarbon solvent-soluble urea-formaldehyde-alcohol condensate in the reactant alcohol.

8. A homogeneous plastic reaction product of (1) a fluid dextran-modified polyester obtained by interaction of ingredients consisting essentially of phthalic anhydride, propylene glycol and dextran, and (2) a solution of a hydrocarbon solvent-soluble urea-formaldehyde-alcohol condensate in the reactant alcohol.

9. A homogeneous plastic reaction product of (1) a fluid dextran-modified polyester obtained by interaction of components consisting essentially of a substance selected from the group consisting of unsaturated polycarboxylic acids and anhydrides thereof, a polyhydric alcohol and dextran, and (2) a solution of a hydrocarbon solvent-soluble urea-formaldehyde-butanol condensate in the reactant butanol.

10. The method of making homogeneous plastic products which comprises mixing a fluid resinous unsaturated polyester obtained by interaction of components consisting essentially of a substance selected from the group consisting of unsaturated polycarboxylic acids and anhydrides thereof, a polyhydric alcohol and dextran with a solution of a hydrocarbon solvent-soluble condensate of urea, formaldehyde and a monohydric alcohol in an excess of the reactant alcohol, and mechanically working the mass under heating until a substantially homogeneous reaction product is obtained.

11. The method according to claim 10, characterized in that the unsaturated polyester is obtained by interaction of components consisting essentially of maleic anhydride, a polyhydric alcohol and dextran.

12. The method according to claim 10, characterized in that the unsaturated polyester is obtained by interaction of components consisting essentially of phthalic anhydride, a polyhydric alcohol and dextran.

13. The method according to claim 10, characterized in that the unsaturated polyester is obtained by interaction of components consisting essentially of maleic anhydride, glycerol and dextran.

14. The method according to claim 10, characterized in that the unsaturated polyester is obtained by interaction of components consisting essentially of maleic anhydride, propylene glycol and dextran.

15. The method according to claim 10, characterized in that the unsaturated polyester is obtained by interaction of components consisting essentially of phthalic anhydride, glycerol and dextran.

16. The method according to claim 10, characterized in that the unsaturated polyester is obtained by interaction of components consisting essentially of phthalic anhydride, ethylene glycol and dextran.

17. The method according to claim 10, characterized in that the unsaturated polyester is obtained by interaction of components consisting essentially of phthalic anhydride, propylene glycol and dextran.

References Cited in the file of this patent

UNITED STATES PATENTS

| | | |
|---|---|---|
| 2,293,164 | Myer | Aug. 18, 1942 |
| 2,323,357 | Rosenblum | July 6, 1943 |
| 2,454,187 | Leape et al. | Nov. 16, 1948 |
| 2,624,768 | Toulmin | Jan. 6, 1953 |